US012613713B2

(12) United States Patent　　　　(10) Patent No.: US 12,613,713 B2
　　　Kruk　　　　　　　　　　　　　　(45) Date of Patent: Apr. 28, 2026

(54) SYSTEM AND METHOD FOR ON-SITE COMMUNICATION WIDGET CONFIGURATION

(71) Applicant: Livechat Software S.A., Wroclaw (PL)

(72) Inventor: Konrad Kruk, Wroclaw (PL)

(73) Assignee: SPOLKA AKCYJNA, Wroclaw (PL)

( * ) Notice: Subject to any disclaimer, the term of this patent is extended or adjusted under 35 U.S.C. 154(b) by 52 days.

(21) Appl. No.: 18/228,141

(22) Filed: Jul. 31, 2023

(65) Prior Publication Data

US 2024/0078121 A1　　Mar. 7, 2024

Related U.S. Application Data

(60) Provisional application No. 63/403,722, filed on Sep. 3, 2022.

(51) Int. Cl.
　　*G06F 3/04847*　　(2022.01)
　　*G06F 3/04845*　　(2022.01)
　　*G06F 9/451*　　　(2018.01)
(52) U.S. Cl.
　　CPC .......... *G06F 9/451* (2018.02); *G06F 3/04845* (2013.01); *G06F 3/04847* (2013.01)

(58) Field of Classification Search
　　CPC ... G06F 9/451; G06F 3/04845; G06F 3/04847
　　See application file for complete search history.

(56) References Cited

U.S. PATENT DOCUMENTS

| | | | |
|---|---|---|---|
| 2006/0005207 A1* | 1/2006 | Louch ........................ | G06F 8/38 717/100 |
| 2014/0115466 A1* | 4/2014 | Barak ................... | G06F 3/0484 715/765 |
| 2021/0136011 A1* | 5/2021 | Chang ................... | H04L 51/046 |
| 2022/0414179 A1* | 12/2022 | Gulati ................... | H04L 63/083 |

* cited by examiner

*Primary Examiner* — Mahelet Shiberou
(74) *Attorney, Agent, or Firm* — BelayIP

(57) ABSTRACT

Instant messaging and messaging window modification options are disclosed herein. In particular, the functionality of chat widget modification with a real time preview are discussed. In application of this disclosure, a user is enabled to configure the chat widget directly on the webpage of an application. Further, a possibility is provided to see implemented changes and location of the chat widget during modification as well as to further save any modifications in the browser memory so as to provide efficient data display. Furthermore, the disclosed invention saves the data of the final configuration of the chat widget directly in a database which may include cloud storage.

15 Claims, 8 Drawing Sheets

401

400

SYSTEM AND METHOD FOR ON-SITE COMMUNICATION WIDGET CONFIGURATION

CROSS REFERENCE TO RELATED APPLICATIONS

This application claims priority to US Provisional Patent Application filed Mar. 9, 2022 and assigned Application No. 63/403,722, the content of which is herein incorporated by reference.

BACKGROUND OF THE INVENTION

The present invention pertains to an improved system and method for configuring and customizing chat widgets used in instant communication channels. Currently, configuring chat widgets typically involves navigating to system settings, which poses challenges for users as they have to leave the webpage context to preview and adjust the widget's appearance. This process results in technical difficulties and delays in aligning the widget's visual presentation with the webpage.

Additionally, these conventional approaches often fail to efficiently utilize the processing power of on-site server storage and browser memory. To overcome these limitations, the disclosed invention introduces a novel solution that allows for full-size chat preview directly on the website where the chat widget is embedded. Users are empowered to adjust various on-site appearance parameters, such as theme, colors, position, and offsets. Integration with the website's design is facilitated through a color picker, enabling the importation of the webpage's background color to the chat widget. Real-time configuration changes can be previewed instantly, eliminating the need to save settings repeatedly.

Furthermore, the invention incorporates a dark mode switch and provides different chat widget themes for maximized and minimized states. Users are also granted the ability to alter the form of the chat widget to alternative shapes, expanding customization possibilities. The disclosed system features an on-site editor that is displayed directly on the webpage. This editor allows users to choose from predefined visual presets or adjust colors using a diverse color palette. Furthermore, users can customize the widget's location, spacing, and color to seamlessly match the content and layout of the webpage.

By eliminating the need to switch between separate environments, the invention enhances user understanding of the webpage accessibility, ensuring a more intuitive and efficient customization process. Additional customization options are made available, including an extensive color palette that further enhances widget customization, as well as predefined setup modes with presets of available settings for simplified configuration.

The system is also equipped with the capability to detect whether a chat widget is already installed on a given website, automatically populating the widget's address if applicable. In cases where a chat widget is not present, the system provides a static screenshot of the webpage, enabling users to preview and configure the widget accordingly. User authentication is implemented to ensure authorized access, safeguarding against unauthorized editing. The disclosed invention represents a significant advancement over the existing state of the art by enabling convenient and on-site configuration of chat widgets.

By seamlessly integrating the customization process within the webpage context, the invention enhances the overall user experience, streamlining the alignment of chat widgets with webpage design and maximizing their impact in instant communication channels.

BRIEF SUMMARY OF THE INVENTION

The present disclosure relates to an improved system and method for configuring and customizing chat widgets for instant communication channels. Currently, chat widgets are typically configured in system settings, requiring users to leave the webpage context to preview and adjust the widget's appearance. This leads to technical challenges and delays in matching the widget's appearance with the webpage. Presented embodiments of the invention address this matter ensuring efficient use of processing power of both on-side server storage and browser memory.

The disclosed invention provides a solution by allowing full-size chat preview directly on the website where the chat widget is located. Users can adjust the on-site appearance, including theme, colors, position, and offsets. A color picker facilitates importing the website's background color to the chat widget. Configuration changes can be previewed instantly without the need to save settings. Additionally, a dark mode switch and chat widget themes for maximized and minimized states are provided. Users can also change the form of the chat widget to alternative shapes.

The disclosed system includes an on-site editor displayed on the webpage, allowing users to use predefined visual presets or adjust colors using an available color palette. Users can customize the widget's location, spacing, and color to match the webpage's content. By eliminating the need to switch between separate environments, the invention enhances user understanding of webpage accessibility. Further customization options include an extensive color palette for better widget customization and predefined setup modes with presets of available settings.

The system detects if a chat widget is already installed on a website and automatically populates its address. For websites without an installed widget, a static screenshot is provided for previewing and configuring the widget. User authentication is performed to ensure authorized access and prevent unauthorized editing. The disclosed invention improves the current state of the art by enabling convenient and on-site configuration of chat widgets, enhancing their integration with webpages and improving user experience.

DETAILED DESCRIPTION OF THE INVENTION

Figure 1:
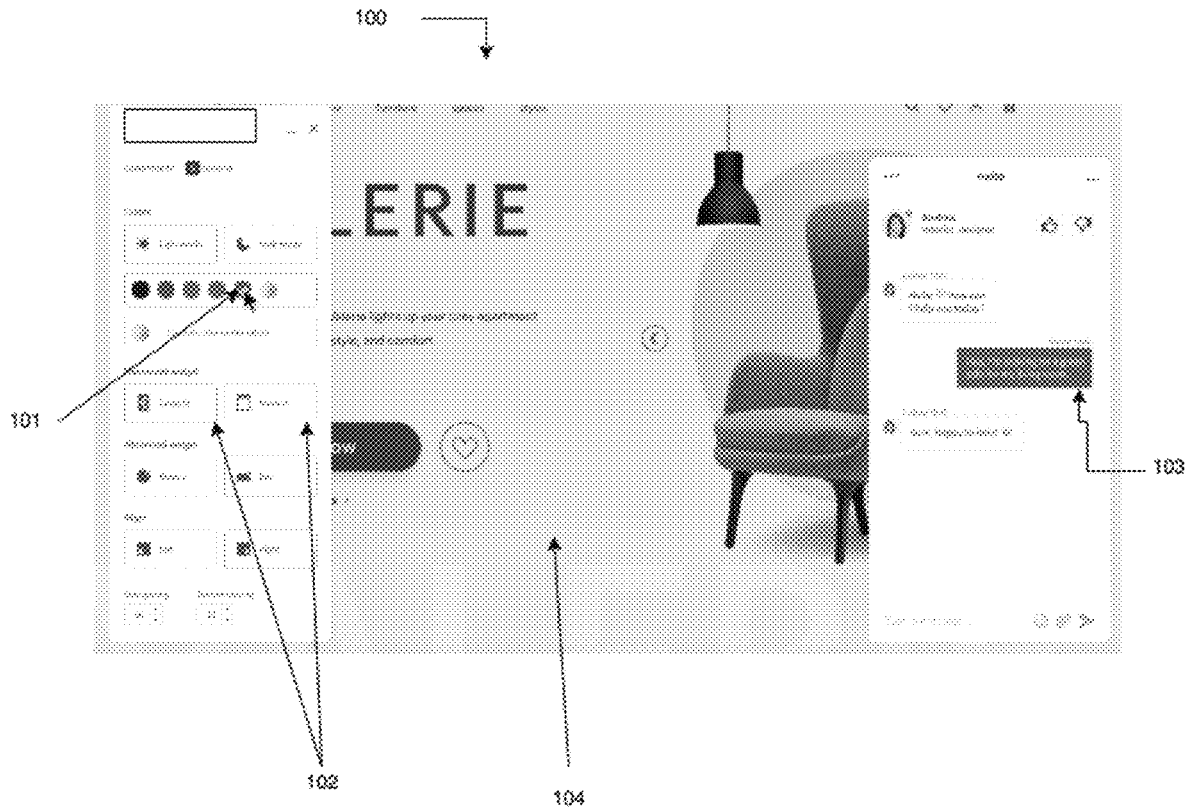
FIG. 1 depicts an overview of the chat widget configurator displayed in the left side of the webpage where the chat widget is being installed.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C. In the figures, the same or functionally identical elements have been provided with the same reference signs.

Instant communication channels are currently one of the most popular means of message exchanges of information. Currently known solutions of instant communication employ an element usually referred to as chat widget. Use of chat widget is configured in the system settings to display the element on the webpage further viewed by the webpage visitor. Configuration of a chat widget inside of and separated from the chat widget application brings certain technical challenges as, among others, the requirement that the embodiment user leave the context of the webpage where the widget shall be located and further to preview the page thus requiring the next change of context to see the page with the widget configured instead of system settings. Aligning the widget in two places, namely target location and settings, extends the time needed to introduce the setting and limit the chance of the chat user matching the appearance of the chat widget to the page on which it is to be embedded.

The disclosed invention addresses these challenges by introducing a novel system that enables full-size chat preview directly on the website where the chat widget is located. Users can customize various on-site appearance parameters, such as theme, colors, position, and offsets, ensuring seamless integration with the webpage's content. A color picker feature facilitates the importation of the website's background color to the chat widget, enhancing visual harmony. Additionally, the invention provides a configuration preview function, eliminating the need to save settings repeatedly by providing real-time visibility of changes. Dark mode and chat widget themes for maximized and minimized states are also introduced to enhance user customization options. The specification further explains the ability to change the form of the chat widget to alternative shapes, expanding the range of available design options.

In particular, the embodiment of the invention enables second user of the invention to apply below defined steps:

Full-size chat preview directly on the website of an instant communication channel user wherein a website means the place of location of the chat widget;

Adjustable on-site appearance, including theme, colors, position, and offsets;

Color picker facilitating easy import to the website's background color applied to the chat widget;

Configuration preview without the need to save the settings due to on-site visibility of the change;

Dark mode switch, along with a preview of the widget in predefined mode;

Chat widget theme for maximized and minimized states; and

Position, including alignment and spacings.

The disclosed system includes an on-site editor that is displayed directly on the webpage, enabling users to use predefined visual presets or adjust colors using an extensive color palette. The specification provides detailed descriptions of the on-site editor's functionality, including its interaction with the webpage elements and the user's ability to customize the widget's location, spacing, and color to match the webpage's content. To further enhance customization, the specification describes the provision of predefined setup modes with presets of available settings. These modes offer users preconfigured combinations of visual and functional elements that can be easily applied to the chat widget. Preview of elements described above is available directly on the webpage. Such functionality is further available thanks to the dual storage source, namely web browser that stores the most recent modifications of the chat widget and enables to preview them directly on the webpage with no need to communicate with the server each time when such modifications of the visual or functional elements of the chat widget occur.

Furthermore, the configuration setting enables, as applied herein, and includes an option to change the form of chat widget, for example, a change from typical bubble to the bar or any other, alternative form, of on-site communication widget. In this embodiment of the invention, the change may be previewed by the second user of the embodiment directly on the webpage. As a consequence, all changes are directly visible to the second user upon modifications and becomes visible to the first user of the embodiment upon publishing it on the webpage.

FIG. 1 discloses the context of the webpage with the chat widget edition mode located directly on the webpage (104). The depicted and disclosed editor enables the user to use predefined visual presets (102) or to adjust the colors of particular elements on screen (103) from an available color palette.

In particular, the embodiment of the invention enables the second user to apply the below-defined steps for efficient configuration of the chat widget:

The invention allows the second user to access a full-size chat preview directly on the website of an instant communication channel. This preview is made accessible through the use of the browser's cache memory. By utilizing the cache memory, the second user can view and preview changes without the need for repetitive requests to the server, resulting in more efficient adjustment of the webpage's appearance. The webpage dynamically adjusts based on the changes made, enhancing the user experience and optimizing system resources.

When the second user selects the desired appearance of the chat widget, such modifications are saved on the server. These saved modifications become visible to the first user on their respective first user processor. The communication between the browser and the server enables the seamless transfer of configuration data, ensuring that the first user can view the updated chat widget configuration in real-time.

The browser establishes communication with the server using standard communication protocols such as HTTP or HTTPS. Through these protocols, the browser sends requests to the server to retrieve or update data related to the chat widget configuration. The server processes these requests and responds with the necessary data or confirmation of the changes made. This communication flow enables the synchronization of the chat widget configuration between the second user's browser and the first user's processor, ensuring consistency and real-time updates. By employing efficient cache utilization and establishing reliable communication between the browser and the server, the invention enhances the configuration process of the chat widget, enabling seamless previewing and synchronization of changes between users. This technical implementation optimizes system resources and improves the overall user experience.

Figure 3:
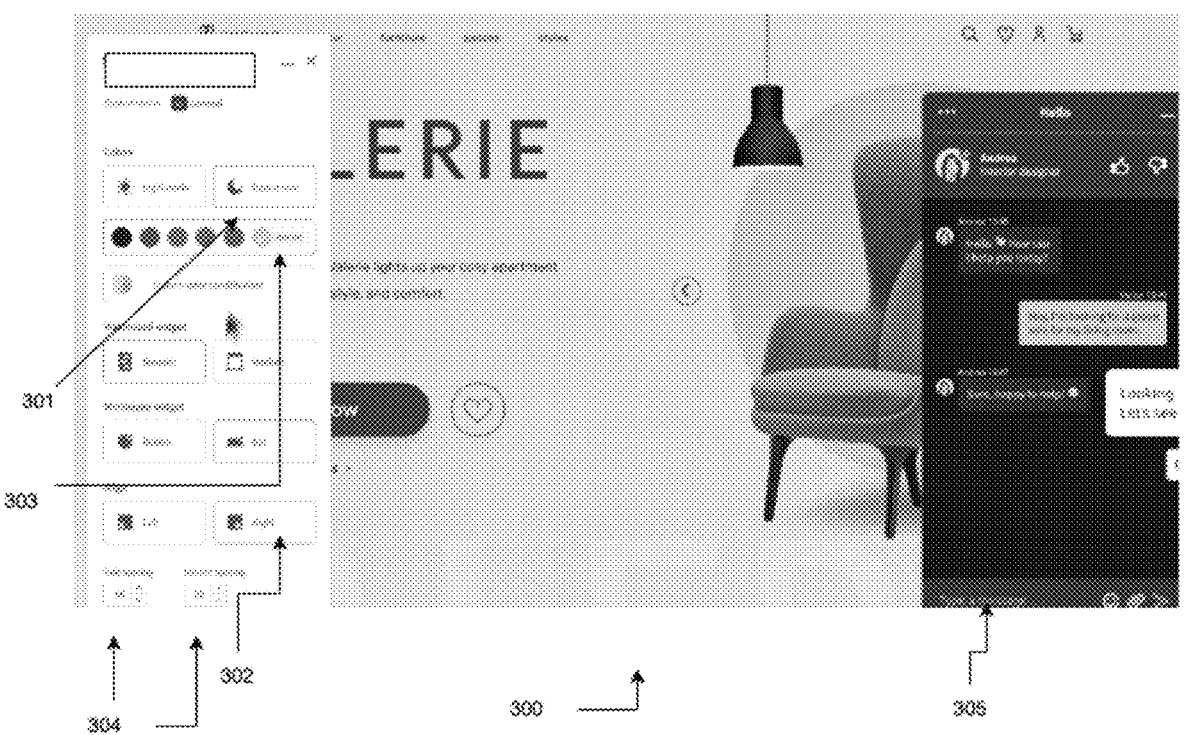
FIG. 3 depicts an overview of the chat widget configurator with the color themes configuration and dark and light mode displayed in the left corner of the webpage where the chat widget is being installed.

Customization of the chat widget on-site enables a setup of the widget location in the context of the webpage in a manner that corresponds to the content displayed on the webpage. As disclosed by FIG. 3, the user can locate the widget respectively on the right side (302), select the spacing from the button and side of the chat widget to properly embed the widget (304). Spacing is selected from a numeric list or field to enter a specific value. Furthermore, the user can select the color from the palette (303) and check how the particular color corresponds with the selected theme as, for example, dark mode (301) and location (305). Without the currently claimed invention the user needs to set up the widget location and colors in an environment that is separated from the website context and then preview every change independently. With the disclosed invention, the embodiment user can view and configure the changes directly on the website while viewing the website context and content. Such a solution provides a better understanding of both locations and colors used on site. Accessibility of the webpage is dictated by the colors and font size as well as elements of the interface location. The aforementioned is an improvement to the currently known state of the art.

Figure 2:
FIG. 2 depicts an overview of the chat widget configurator with the color pallet configuration displayed in the left corner of the webpage where the chat widget is being installed.

FIG. 2 presents a more extensive color palette to ensure better customization of the widget (201). The instant system and method enables the user of the presently disclosed invention to sample the color of a particular webpage element and then map it on and/or to a color palette in order to match the webpage.

In addition to the individual set up of colors, font and location of the chat widget on site, the presently disclosed invention further provides predefined set up modes that include presets of all available settings. The user can also configure the shape of the chat widget according to the settings disclosed and depicted herein (202).

In addition to the described functionality, the invention incorporates a left panel on the interface of the second user, facilitating the manipulation of the chat widget's visual elements. The user can interact with this panel to customize the appearance of the chat widget in real-time, while simultaneously observing the widget dynamically adjusting its view on the webpage. This immediate feedback enables the second user to make precise visual adjustments to the chat widget, ensuring a personalized and visually appealing user experience. When the second user performs actions or modifications on the left panel, the chat widget displayed on the webpage remains unchanged for the first user of the invention. However, the unsaved changes made by the second user are still stored within the browser session, allowing them to continue refining the chat widget's appearance without affecting the first user's experience.

This design (200) preserves the integrity of the chat widget for the first user while providing flexibility and customization options for the second user. Furthermore, the invention introduces the concept of predefined elements or visual presets that the second user can select and apply to the chat widget. These presets serve various purposes, such as supporting branding efforts by applying consistent visual themes across multiple chat widgets. The second user can choose a preset and share it with other users of the chat widget, enabling a personalized and cohesive visual experience across the platform. This feature fosters collaboration and allows for efficient sharing and adoption of customized themes among users.

By storing the final chat widget configuration in the database located on the server, the invention ensures accessibility and ease of use for other users. The saved configurations can be readily previewed by other users and seamlessly applied to their respective chat widgets using the preview option. This centralized storage of configurations facilitates efficient sharing and adoption of themes, streamlining the process of personalizing and customizing the chat widget's appearance. The dualistic use of storage sources, combining the browser session storage for temporary changes and the server database for final configurations, enables a flexible and efficient workflow for the second user. This design choice enhances collaboration, simplifies theme sharing, and empowers users to create visually appealing and personalized chat widget experiences within the instant communication channel.

Figure 4:
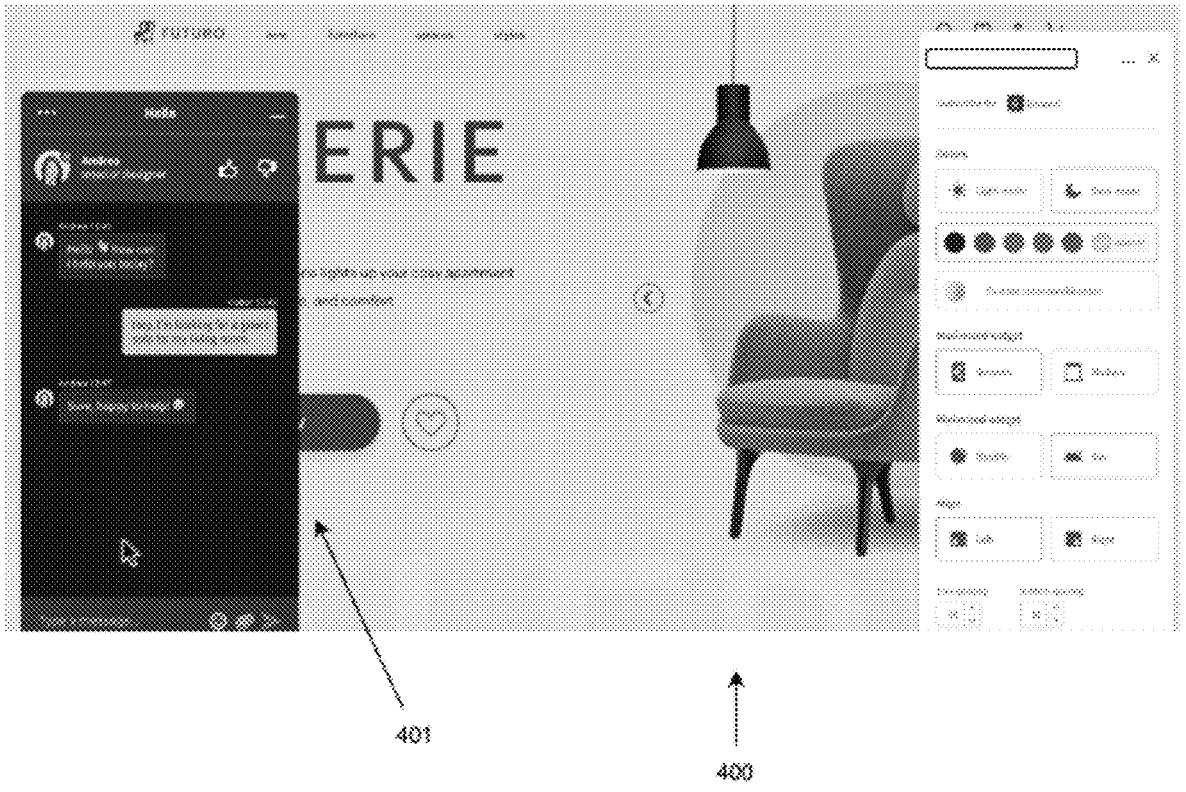
FIG. 4 depicts an overview of the chat widget configurator and chat widget preview with dark mode activated.
Figure 5:
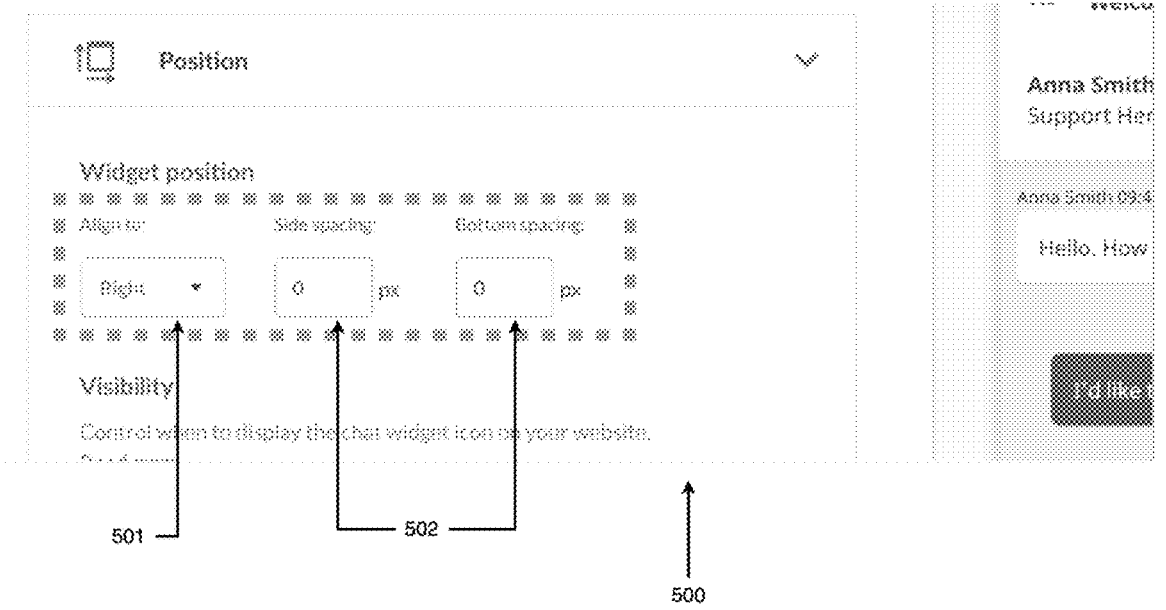
FIG. 5 depicts chat widget positioning configuration.
Figure 6:
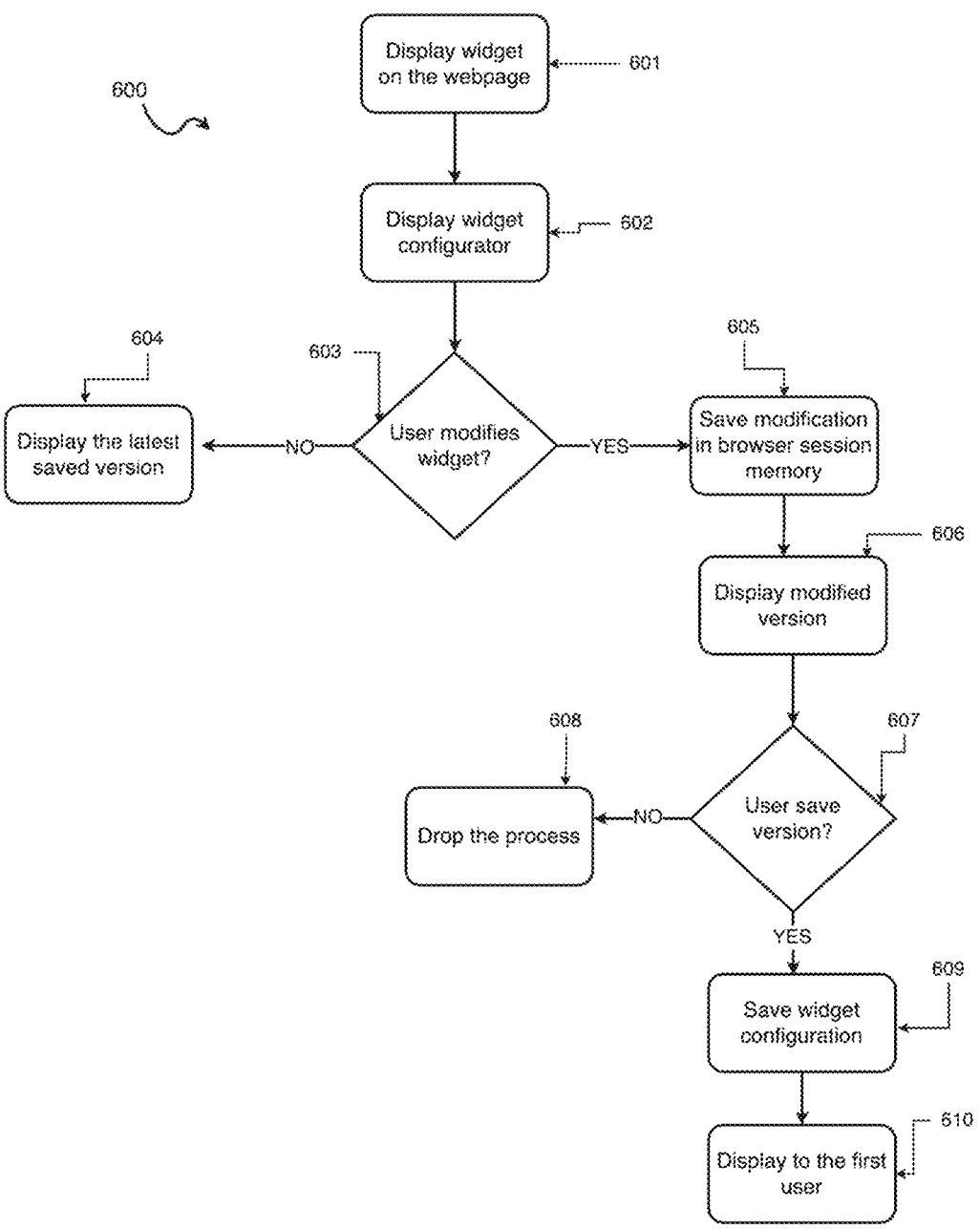
FIG. 6 depicts the flowchart for the chat widget configuration with the use of preview on the website when the second user modifies and saves the modification.
Figure 7:
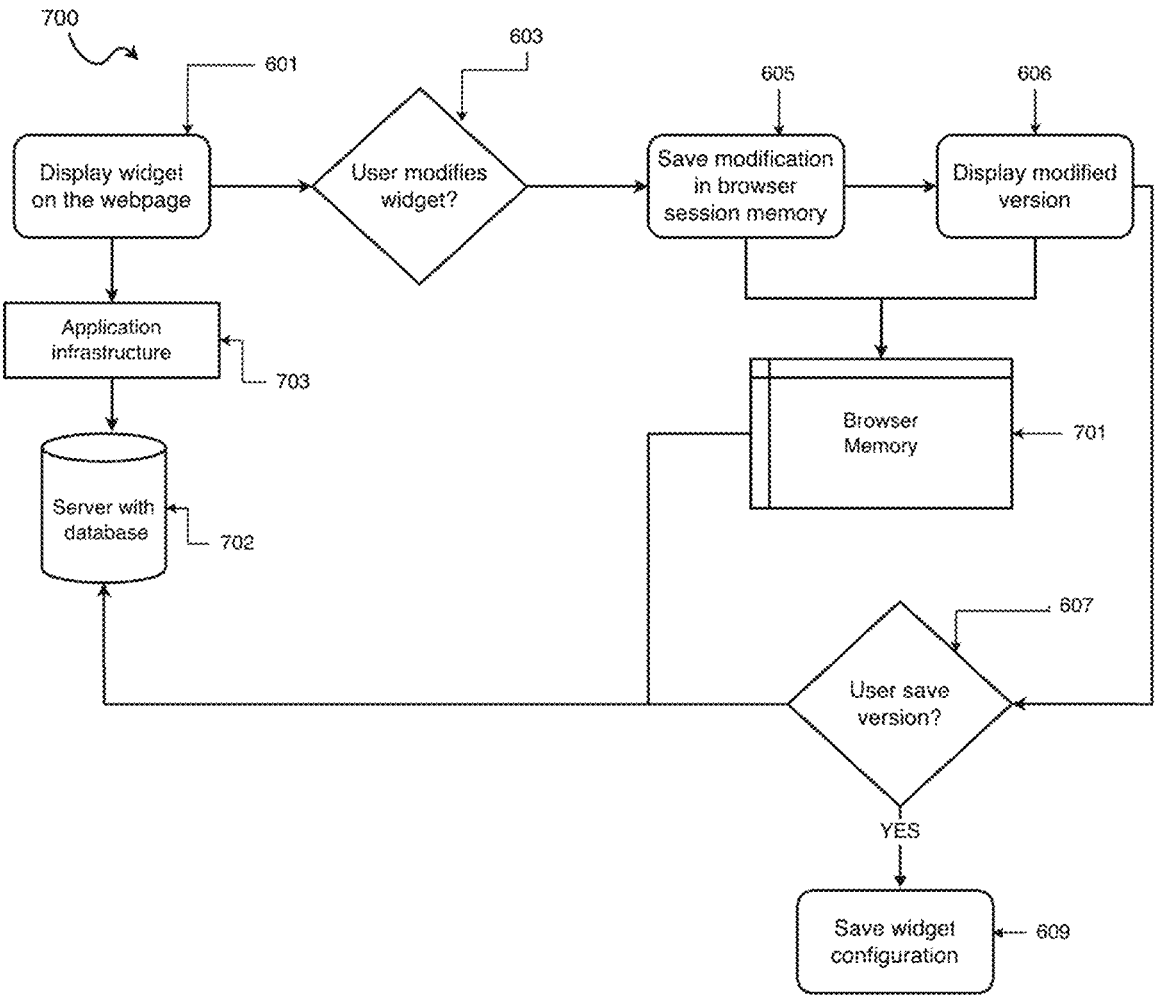
FIG. 7 depicts the flowchart for the chat widget configuration with specific information about data storage source.
Figure 8:
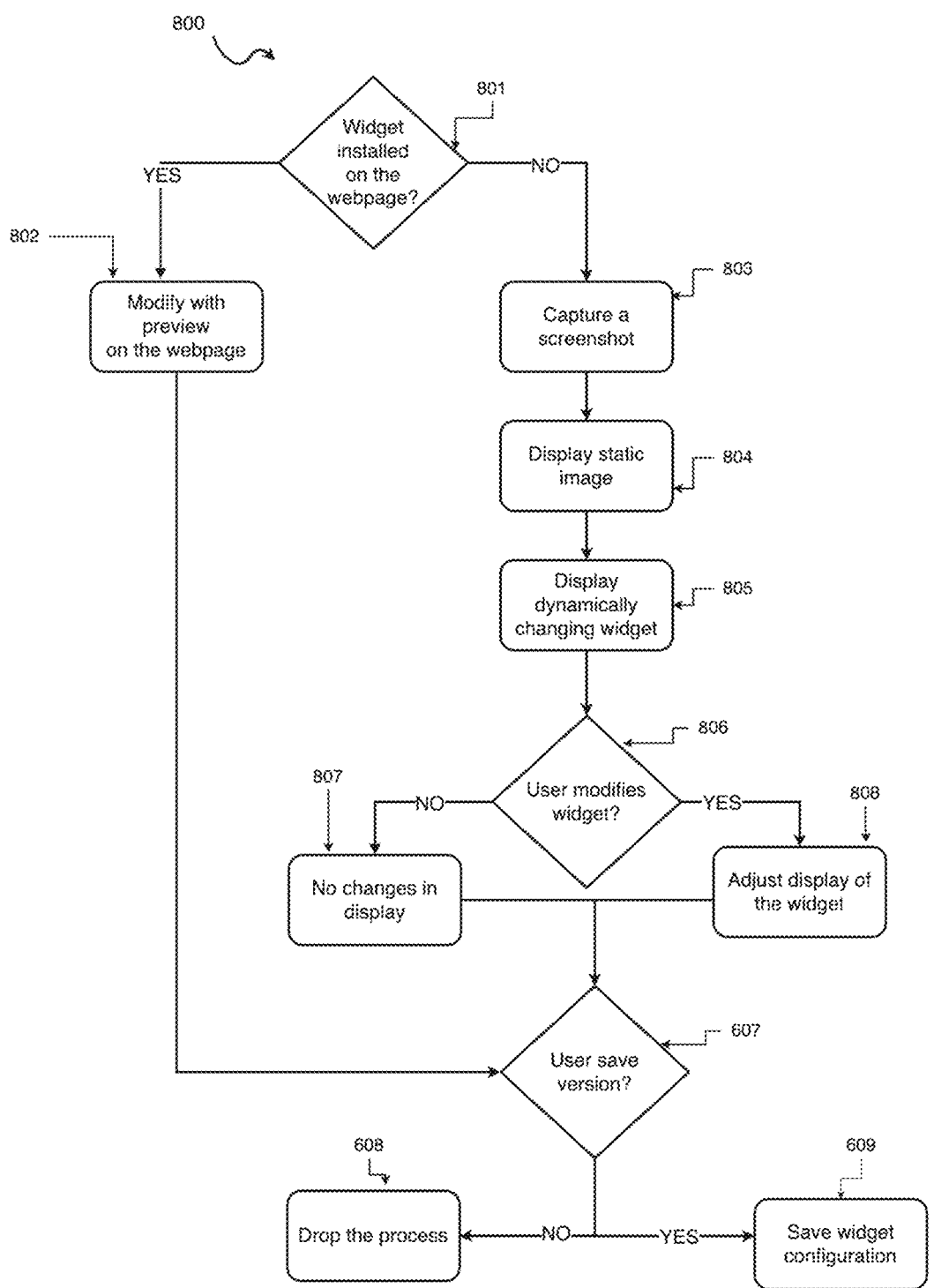
FIG. 8 depicts the for the chat widget configuration with the use of preview of the chat widget when the second user uses a screenshot (static image because there is no chat widget installed on the webpage.

FIG. 4 presents the opposite location of the chat widget wherein the chat widget is located on the left side and to enable further customization of the edit bar which is located on the right side of the displayed screen.

In the disclosed invention, the second user has the ability to modify the colors of specific elements within the chat widget using the browser console. This feature provides a precise and granular control over the visual appearance of the chat widget. By accessing the browser console, the second user can interact with the underlying code and modify the CSS properties associated with the elements of the chat widget. This includes properties such as background color, text color, border color, and other visual attributes that define the appearance of individual elements. For example, if the second user wishes to change the background color of the chat widget, they can identify the corresponding CSS selector for the specific element responsible for the background color.

In the first step the embodiment of the invention, the chat widget is displayed on the webpage (601), on the same webpage the embodiment of the invention displays the chat widget configurator (602) that enables the user to modify the chat widget in a real time. If the user modifies the chat widget (603), then the step of saving such modifications in the browser memory is being performed (605) that further leads to an instant display of the modified widget (606). If the user decides not to modify any of the existing features (604) the embodiment of the invention displays the latest saved version of the widget.

After the widget is being modified (603) the user can decide either to save the version (609) or drop the configuration (608). If the modification is being dropped, the latest version of the chat widget shall be displayed to the first and the second user of the embodiment. If the second user decides to save a modified version of the chat widget (609) then the modification becomes visible to the first user (610).

Using the browser console or the technology equivalent to the browser console that enables to manipulate the image and webpage content displayed during browser session, they can modify the CSS property value associated with that selector, directly changing the color as described in the above paragraph referring to the modification of the chat widget. The changes made in the browser console are immediately reflected in the visual appearance of the chat widget on the webpage, allowing the user to preview and fine-tune the colors in real-time. If the second user of the embodiment decides to modify the chat widget (603) then, modifications are being saved (605) and displayed (606) via browser (701). Precisely, the saving process is based on the browser session (701). If a user saves a modified version of the widget (609) such collection of modifications implemented by the user is being sent to the database (702). Similarly, if the user displays the widget without any modification (601) the embodiment of the invention uses application infrastructure (703) and server with database infrastructure (702) to display the latest configuration of the chat widget.

This capability empowers the second user to experiment with different color combinations, test various visual effects, and achieve the desired aesthetic for the chat widget. The direct modification of element features in the browser console provides a flexible and efficient means to customize the colors of individual elements, ensuring a tailored and visually appealing chat widget experience. It is important to note that these modifications made in the browser console are temporary and specific to the second user's session. They do not permanently alter the chat widget's configuration for other users or persist beyond the current browsing session. The final color selections and configurations are saved and stored in the server's database, ensuring consistency and accessibility for all users across different sessions and devices.

The user can also adjust the location of the chat widget (501) and spacing through the details option of pixels set up (502) to manage it further on the webpage.

The presently disclosed invention detects whether the chat located on the website allows and/or otherwise enables a chat widget edition. Such detection is performed by the URL analysis of the website. If a chat communication widget is already installed on a website, its address will populate automatically.

In addition to modifying colors, the second user can also leverage the power of CSS and overlay modifications within the frontend infrastructure to change the shapes of various elements within the chat widget. This capability enables a high degree of customization and personalization, allowing the user to transform the appearance of boxes, inputs, buttons, and content located on the elements. By utilizing CSS properties such as border-radius, box-shadow, and transform, the second user can manipulate the shapes of different elements within the chat widget. For example, they can round the corners of boxes or inputs, create shadow effects, or apply various transformations like rotations or scaling to achieve unique visual effects. Using overlays, the second user can superimpose additional graphical elements or content onto existing elements of the chat widget. This technique enables the user to add decorative elements, icons, or customized graphics to enhance the overall visual design.

Through these CSS and overlay modifications, the second user gains control over the visual aspects of the chat widget's elements. They can experiment with different shapes, apply creative transformations, and overlay custom graphics to achieve a distinctive and tailored appearance. Similar to color modifications, these shape and overlay changes are performed within the browser console or through other frontend development tools. The modifications made by the second user are immediately rendered in real-time, allowing them to preview and fine-tune the shapes and overlays of the chat widget elements. It's worth noting that these frontend modifications are specific to the second user's session and do not affect the chat widget's configuration for other users. The final shape and overlay selections are saved and stored in the server's database, ensuring consistent presentation and accessibility across all users' interactions with the chat widget.

In the other embodiment of the invention, the first step is to check if the chat widget is installed on the webpage (801). In situations where the chat communication widget is not already installed on a webpage (804), the embodiment of the invention introduces a solution of screenshot (static image) (803). In such cases, the invention provides a screenshot of the website to the second user (803), allowing them to configure the chat widget and make adjustments to all available options (805). It is important to note that this functionality is specifically designed for the preview option and operates in a fully static mode using the website screenshot. The process begins by capturing a static image of the website (803), which serves as the base for the configuration and customization of the chat widget. The user is then presented with an overlay interface that dynamically interacts with the static image (805).

If the user decides to modify the widget (806), this overlay allows the user to make changes and adjustments to the chat widget's configuration options (808). As the user modifies the various options in the overlay interface, the changes are dynamically applied and superimposed onto the static image of the website. This means that the user can see the real-time impact of their configurations on the chat widget's appearance directly within the context of the website. The overlay mechanism ensures that the user can visualize and assess how the chat widget will look and function within the actual website environment. By combining the static website image with the dynamic widget configuration, the invention provides an intuitive and interactive preview experience, enabling the user to fine-tune the widget's appearance to seamlessly integrate with the website.

Once the user is satisfied with the configuration and customization of the chat widget, the final settings can be saved (607). If the chat widget is initially installed on the webpage (802) the embodiment of the invention detects it and allows to modify and preview directly on the webpage and further save such data (609). These saved settings, along with the website screenshot, are then stored in the server's database for future reference and implementation (702). This approach of overlaying the dynamic widget configuration onto a static website image adjusts the preview process, allowing users to accurately visualize and adjust the chat widget's appearance within the context of the website. It streamlines the configuration workflow and enhances the user's ability to create a chat widget that seamlessly aligns with the overall website design.

The embodiment of the invention provides an authentication of the user by comparing the ID shared in the URL with the ID assigned to a particular user in the database to ensure that all editions of the chat widget and preview are performed by the user with a permission to perform such action. For the user not authorized to perform such action the embodiment of the invention shall display an error.

The scope of protection of the present invention is given by the claims and is not limited by the features illustrated in the description or shown in the figures.

What is claimed is:

1. A system for on-site configuration of a chat widget comprising:

a first user processor configured to communicate with the Internet and operate a browser;

a second user processor configured to communicate with a server via a network, the server configured to communicate with the second user processor via the network and to store data in a storage configured to operate on the server, the data comprising chat widget configuration data;

a browser memory configured to store a most recent version of the chat widget configuration data;

a chat widget configured to display a communication thread of at least one user;

a chat widget configurator configured to operate on the second user processor in communication with the server and to modify representation of the chat widget; and wherein the chat widget comprises a widget configured for instant communication to be displayed on a webpage or web application;

wherein the storage is a cloud storage; and wherein another second user is enabled to preview modifications of the chat widget directly on the webpage.

2. The system according to claim 1, wherein the first user processor further comprises:

a data display configured to display a configured view of the chat widget;

a data input configured to receive at least one of text, audiovisual content and emojis from within the communication thread; and wherein the first user processor communicates with the storage via a browser.

3. The system according to claim 1, wherein the second user processor further comprises:

a data display configured to display a view of the chat widget and a preview of the chat widget configuration;

a data input configured to receive at least one of text, audiovisual content and emojis from within the communication thread; and wherein the second user processor is configured to use browser memory to display the preview of the chat widget configuration;

wherein the second user processor is configured to communicate with the storage via the browser; and wherein the preview of chat widget configuration comprises a version of a chat widget visual and functional features visible only to the other user.

4. The system according to claim 1, wherein the server is a virtual server arranged on a physical server comprising a networked connection with the browser and configured to store the chat widget configuration data.

5. The system according to claim 1, wherein the storage is arranged on the server and communicates with the browser via the network.

6. The system according to claim 1, wherein:

the chat widget configuration data further comprises at least one of a location of the chat widget on the webpage, colors and modes of the chat widget, graphic themes of a predefined view, a shape of the chat widget, a spacing between components of the chat widget, color contrasts and size of letter and numbers;

the modes of the chat widget comprise light mode or dark mode; and the graphic themes of a predefined view comprise suggested combinations of configuration data applicable together.

7. The system according to claim 1, wherein the browser memory comprises cache memory configured to at least one of save preview modifications of the chat widget directly on the webpage, modify preview of the chat widget directly on the webpage and display of the chat widget directly on the webpage.

8. The system according to claim 1, wherein:

the chat widget further comprises at least one of a data input configured to accept text, audiovisual content and files; a data display configured to display communication thread;

visual features configured to display graphic elements; functional features configured to display functional element;

the graphic elements comprise chat widget configuration data; and the functional elements comprise at least one of text inputs, data upload inputs, buttons, radio-buttons and checkboxes.

9. The system according to claim 1, wherein the chat widget configurator is further configured to enable the second user to at least one of display preview of the chat widget, modify graphic elements, modify functional elements and request to save the chat widget configuration data.

10. A method for on-site configuration of a chat widget, the method comprising the steps of:

configuring a first user processor to communicate with the Internet and operate on a browser;

configuring a second user processor to communicate with a server via a network;

establishing communication between the server and a second user processor via the network and a storage;

displaying a chat widget to a second user; displaying a chat widget configurator in communication with the server, the chat widget configurator configured to modify representation of the chat widget;

modifying graphic elements and functional elements of the chat widget;

displaying a preview of the chat widget;

saving chat widget configuration data in a browser memory;

saving the chat widget configuration data in the storage; displaying the chat widget to a first user; and wherein the browser memory is configured to store the most recent version of the chat widget configuration data;

wherein chat widget is configured to display a communication thread of at least one of the first user and the second user;

wherein the storage comprises cloud storage; and wherein the second user is enabled to preview modifications of the chat widget directly on the webpage.

11. The method according to claim 10, wherein the step of displaying the chat widget to a first user further comprises the steps of:

displaying the configured view of the chat widget; and enabling input for text, audiovisual content and emojis in a communication thread; and wherein the first user processor is configured to communicate with the storage via the browser.

12. The method according to claim 10, wherein the step of modifying graphic elements and functional elements of the chat widget further comprises the steps of at least one of:

modifying location of the chat widget on the webpage;

modifying colors and modes of the chat widget;

applying graphic themes of a predefined views;

modifying shape of the chat widget;

modifying spacing between components of the chat widget;

modifying color contrasts; and modifying size of letter and numbers; and wherein the second user is enabled to apply at least one of the steps of modifying;

wherein modes of the chat widget comprise light mode or dark mode; and wherein graphic themes of a predefined view comprise suggested combinations of configuration data applicable together.

13. The method of claim 10, wherein the step of displaying a preview of the chat widget further comprises the steps of:

saving preview modifications of the chat widget directly on the webpage;

displaying a latest version of the chat widget configuration data;

modifying preview of the chat widget directly on the webpage; and displaying the chat widget directly on the webpage; and wherein the step of displaying the chat widget preview directly on the webpage further comprises the step of using browser memory to display the chat widget preview.

14. The method according to claim 10, wherein the step of saving a chat widget configuration data in the storage is performed when the data is saved as a final setting of the chat widget after preview.

15. The method according to claim 12, wherein the step of modifying graphic elements and functional elements of the chat widget further comprise the steps of:

displaying a preview of the chat widget on the webpage;

modifying the graphic elements during the displaying on the webpage;

modifying the functional elements during the displaying on the webpage; and requesting to save the chat widget configuration data.

* * * * *